Dec. 12, 1967 N. ZARICHANSKY 3,357,447
BREATHING APPARATUS DEMAND VALVE
Filed April 5, 1965 2 Sheets-Sheet 1

INVENTOR.
NICHOLAS ZARICHANSKY
BY
Brown, Critchlow, Flick & Peckham.
ATTORNEYS.

INVENTOR.
NICHOLAS ZARICHANSKY.
BY
Brown, Critchlow, Flick & Peckham.
ATTORNEYS.

United States Patent Office 3,357,447
Patented Dec. 12, 1967

3,357,447
BREATHING APPARATUS DEMAND VALVE
Nicholas Zarichansky, East McKeesport, Pa., assignor to Mine Safety Appliances Company, Pittsburgh, Pa., a corporation of Pennsylvania
Filed Apr. 9, 1965, Ser. No. 446,877
2 Claims. (Cl. 137—494)

ABSTRACT OF THE DISCLOSURE

A breathing apparatus demand valve contains a diaphragm forming one side of a chamber communicating with a lateral inlet and with an outlet opposite the diaphragm. A normally closed valve in the inlet has a stem that is moved laterally by the diaphragm to tilt the valve open. A stop in the valve chamber limits the movement of part of the diaphragm toward the outlet so that during inhalation the diaphragm will tilt back against the wall beside the outlet.

---

A common type of demand valve is one in which a diaphragm is flexed every time the user inhales, the movement of the diaphragm being employed to tilt a valve head that normally closes the inlet of the valve. Air, oxygen or other breathing gas can then flow through the valve. During exhalation, the diaphragm and valve head return to their normal positions so that the valve is closed. One difficulty with such valves has been that the entering breathing gas tends to spread out into a fantail shape inside the valve housing, thereby creating turbulence which increases resistance to flow, causes the diaphragm to flutter, and sometimes produces an aspirating effect that draws the diaphragm across the inlet and thereby more or less closes it off. Another difficulty has been that the valve head forms too much of an obstruction to the inlet while the valve is open.

It is among the objects of this invention to provide a demand valve, in which the flow of breathing gas through the valve is stabilized and directed, in which the incoming gas helps hold the diaphragm in valve-opening position, in which the resistance to flow is not increased, in which the diaphragm cannot interfere with the valve inlet, and in which fluttering of the diaphragm is eliminated.

In accordance with this invention, a valve housing has a back wall provided with a central outlet port and with an internal diaphragm. The edge of the diaphragm is sealed to the housing near its front. The diaphragm has a stiff central portion that is movable backward in the housing during inhalation at the outlet port. The side of the housing behind the diaphragm is provided with an inlet passage that is encircled at its outer end by a valve seat, on which a tiltable valve head normally is held by a spring. A stem is fastened to the center of the valve head and extends through the inlet passage to a point behind the stiff central portion of the diaphragm. When the diaphragm moves rearwardly in the housing it engages the inner end of the stem and tilts the stem and valve head to open the valve. A stop is rigidly mounted between the stem and the diaphragm in the path of the part of the stiff portion near the inlet passage. Consequently, when the diaphragm is drawn backward in the housing during inhalation, the stiff portion of the diaphragm engages the stop and tilts on it back toward the back wall of the housing. Preferably, the stop is a vane that extends into the housing from the inlet passage and is located at the front side of that passage with the concave side of the vane facing the back of the housing. For best results, the valve head, which is of generally circular configuration, is provided around its periphery with a plurality of circumferentially spaced notches that allow more incoming gas to pass the valve head when it is open than otherwise would be the case.

Figure 1:
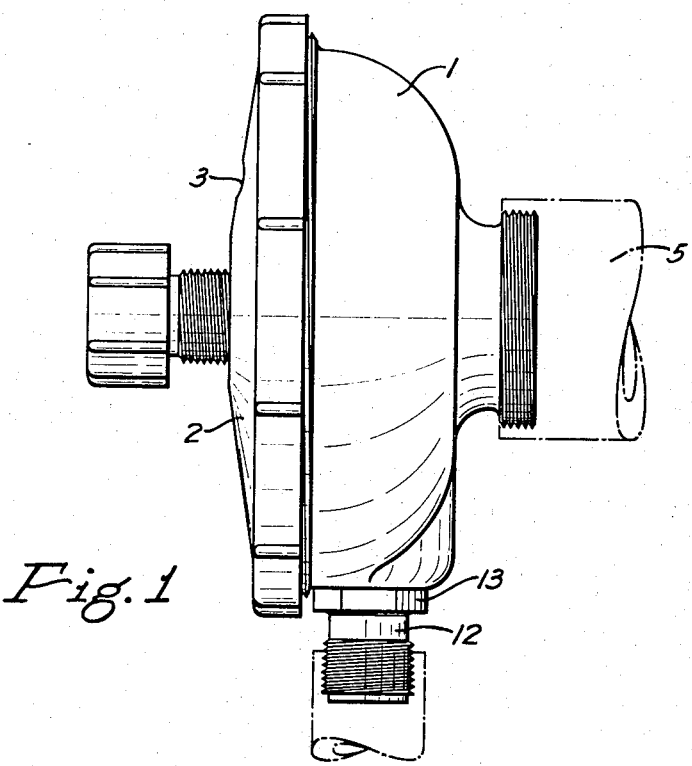
Figure 3:
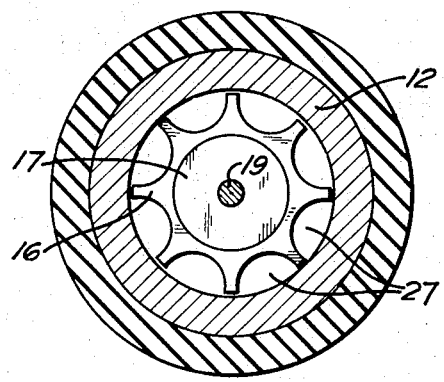
Figure 2:
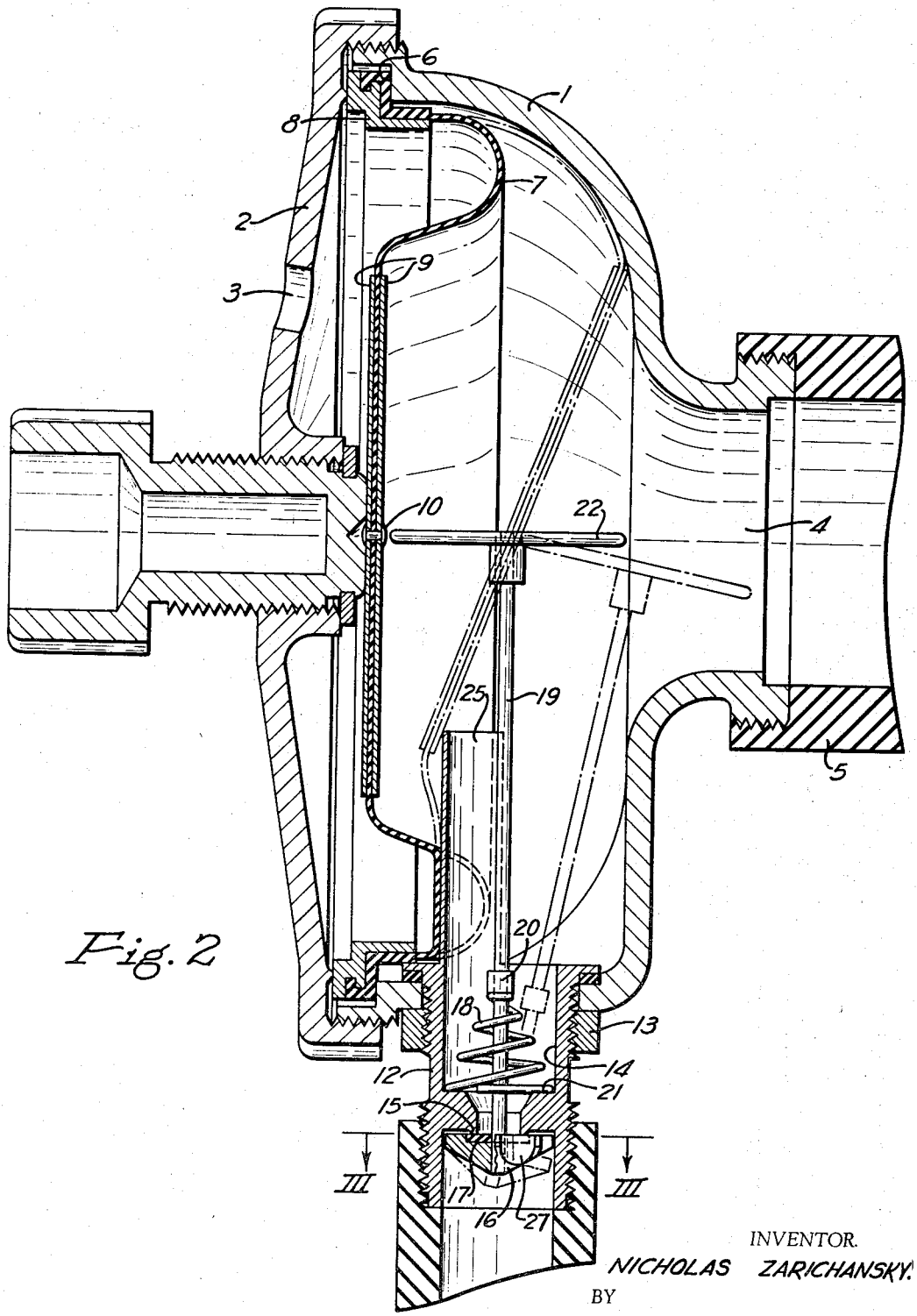

The preferred embodiment of the invention is illustrated in the accompanying drawings, in which FIG. 1 is a side view of the valve;
FIG. 2 is an enlarged central cross section through the valve, showing in dotted lines the positions of the movable parts while the valve is open; and
FIG. 3 is a further enlarged cross section taken on the line III—III of FIG. 2.

Referring to FIGS. 1 and 2 of the drawings, the valve housing may be formed from a cup-like member 1 provided with a threaded edge on which a cover 2 is screwed. The cover is provided with a vent opening 3. The center of the base or back of the housing is provided with an opening encircled by a rearwardly projecting tubular wall to form an outlet port 4. The outer end of the outlet wall is screw-threaded so that the valve can be connected to the inhalation hose 5 of breathing apparatus.

Clamped against an annular shoulder 6 in the front part of the housing member 1, as shown in FIG. 2, is the edge of a flexible diaphragm 7. The clamping may be done by a clamping ring 8 that is pressed against the diaphragm by cover 2. The central portion of the diaphragm is made stiff by clamping it between two circular discs 9 that are connected together at their centers by a rivet 10 or the like. The portion of the diaphragm encircling these discs when they are in normal position at the front of the housing forms a rearwardly extending loop.

Behind the diaphragm, the side wall of the housing is provided with an opening in which the inner end of a flanged inlet tube 12 is clamped and sealed by means of a nut 13 threaded on the tube and screwed up tight against the housing. The tube forms an inlet passage 14 having an outer end portion that is reduced in diameter and encircled by a valve seat 15. Preferably, this tube is disposed radially of the housing and at right angles to the outlet port 4. The outer end of the tube is screw-threaded for connection to a source of oxygen, compressed air or other breathing gas. In order to close the inlet, a valve head 16 is disposed in the outer end of the inlet tube and is provided with a gasket 17 that engages the seat. The head normally is held on the seat by means of a spiral spring 18 that encircles a stem 19 connected to the center of the head and extending in through the inlet passage 14. The spring may be compressed between a collar 20 on the stem and a shoulder 21 in the tube.

The valve stem extends into the housing, preferably to a point behind the center of the diaphragm. Mounted on the inner end of the stem is a head 22, which preferably is circular and large enough to nearly engage the center of the diaphragm while the diaphragm is in its forward position and the valve head is on its seat. It will be seen that when the user of this valve inhales, the reduction in air pressure at outlet port 4 of the valve housing will permit normal atmospheric pressure in front of the diaphragm to move the central portion of the diaphragm rearwardly in the housing and thereby tilt valve stem 19 backward.

It is a feature of this invention that the stiff central portion of the diaphragm does not move straight back as has been the practice heretofore and which has disadvantages. On the contrary, the stiff portion is caused to tilt in the housing as it moves backward. This is done by means of a stop 25 that is rigidly mounted in the valve housing between stem 19 and the diaphragm in the path of movement of the part of discs 9 that is near the inlet passage 14. Consequently, soon after the central portion of the diaphragm starts to move backwardly in the housing during inhalation, it engages the stop and therefore tilts on the stop back toward the back wall of the housing as shown in dotted lines in FIG. 2. For best results, it will tilt far enough to engage the housing back wall at the side of the outlet port 4 opposite to the inlet passage.

Stop 25 most suitably takes the form of a vane that extends radially into the housing from the inner end of the inlet passage. This vane may be integral with inlet tube 12. To obtain the most benefit from the vane, it is located at the front side of the inlet passage and is approximately semicircular in cross section with its concave side facing the back of the housing. The curved vane helps to keep the incoming breathing gas from spreading out as it leaves the inlet passage and creating turbulence.

Due to the tilted position of the diaphragm while the valve is open and to its engagement with the vane and the back wall of the housing, fluttering of the diaphragm is avoided. The gas passing through the valve now is provided with a confined path leading from the inlet directly to the outlet port. The diaphragm and vane stabilize and direct the flow.

Another advantage of this valve is that as the circular head 22 of the valve stem is moved rearwardly by the diaphragm, the head enters the tubular outlet port 4 and is guided by it so that it cannot swing sideways to any great extent. For this purpose the inner diameter of the outlet is only a little larger than the diameter of the stem head.

A still further feature of this invention is that the valve head 16, which has a generally circular shape, is provided around its periphery with a plurality of circumferentially spaced notches 27. These notches preferably have arcuate side walls as shown in FIG. 3. When the head is tilted, one or two of the radial projections between the notches will engage the radial surface encircling valve seat 15 so that the tilted valve head will be completely removed from the seat. Due to the notches, the entering breathing gas will not be obstructed by the valve head in flowing to the inlet passage, even though when the valve head is seated there is only a slight clearance between its periphery and the encircling wall of inlet tube 12. Due to this slight clearance, the head is held centered relative to the valve seat while the valve is closed. When it is opened, the flow is past the head through its notches.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A breathing apparatus demand valve comprising a housing having a back wall provided with a central outlet port, a flexible diaphragm in the housing, means sealing the edge of the diaphragm to the housing near its front to form a chamber between the diaphragm and the back wall of the housing communicating with said port, the diaphragm being responsive to variations in pressure in said chamber and having a stiff central portion movable toward the outlet port during inhalation at said outlet port, the side of the housing in said chamber being provided with an inlet passage encircled at its outer end by a valve seat, a tiltable valve head for said seat, a spring normally holding said head on the seat, a stem fastened to the center of the valve head and extending through the inlet passage to a point adjacent said stiff central portion of the diaphragm, a head on the inner end of the stem for engagement by the rearwardly moving diaphragm to tilt the stem and valve head, and a stop rigidly mounted between the stem and diaphragm in the path of the part of said stiff portion between said inlet passage and the portion of the diaphragm engaging said stem head, whereby when the diaphragm is drawn backward in the housing during inhalation said stiff portion of the diaphragm will engage said stop and will tilt on it back into engagement with the back wall of the housing at the side of said outlet port opposite to said inlet passage.

2. A breathing apparatus demand valve comprising a housing having a back wall provided with a central outlet port, a flexible diaphragm in the housing, means sealing the edge of the diaphragm to the housing near its front to form a chamber between the diaphragm and the back wall of the housing communicating with said port, the diaphragm being responsive to variations in pressure in said chamber and having a stiff central portion movable toward the outlet port during inhalation at said outlet port, the side of the housing in said chamber being provided with an inlet passage encircled at its outer end by a valve seat, a tiltable valve head for said seat, a spring normally holding said head on the seat, a stem fastened to the center of the valve head and extending through the inlet passage to a point adjacent said stiff central portion of the diaphragm, a substantially circular head on the inner end of the stem for engagement by the center of the rearwardly moving diaphragm to tilt the stem and valve head, and a stop rigidly mounted between the stem and diaphragm in the path of the part of said stiff portion between said inlet passage and the portion of the diaphragm engaging said stem head, whereby when the diaphragm is drawn backward in the housing during inhalation said stiff portion of the diaphragm will engage said stop and will tilt on it back toward the back wall of the housing, said outlet port having a tubular side wall with an inside diameter only a little greater than the diameter of said stem head, and the outlet port being in a position to receive and guide the stem head when the stem is tilted toward the port by the diaphragm.

References Cited

UNITED STATES PATENTS

| | | | |
|---|---|---|---|
| 2,445,359 | 7/1948 | Meidenbauer | 137—505.43 |
| 2,790,454 | 4/1957 | Benzel | 137—510 |
| 2,988,097 | 6/1961 | Benzel | 137—494 |
| 3,095,890 | 7/1963 | Cousteau et al. | 137—494 |
| 3,232,303 | 2/1966 | Cupp | 137—505.35 |

WILLIAM F. O'DEA, Primary Examiner.

R. GERARD, Assistant Examiner.